No. 757,550.

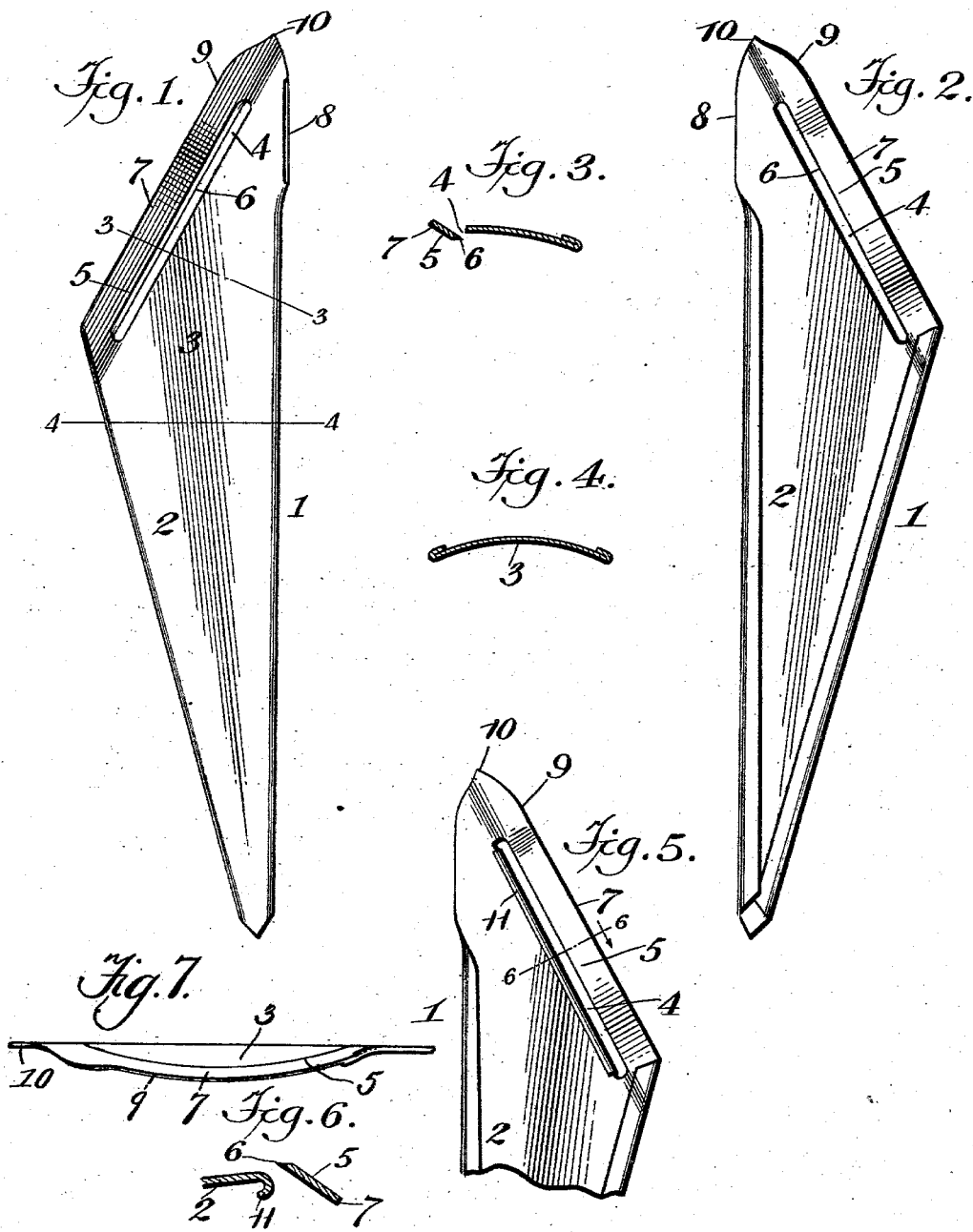

Patented April 19, 1904.

UNITED STATES PATENT OFFICE.

THEODORE M. GUEST, OF MORAVIA, NEW YORK, ASSIGNOR OF ONE-HALF TO GRANT P. SOMMERVILLE, OF MORAVIA, NEW YORK.

FRUIT OR VEGETABLE PEELER.

SPECIFICATION forming part of Letters Patent No. 757,550, dated April 19, 1904.

Application filed April 15, 1903. Serial No. 152,773. (No model.)

*To all whom it may concern:*

Be it known that I, THEODORE M. GUEST, a citizen of the United States, residing at Moravia, in the county of Cayuga and State of New York, have invented a new and useful Fruit or Vegetable Peeler, of which the following is a specification.

This invention relates to an improved vegetable and fruit peeler, and has for its object to provide a simple, inexpensive, and efficient device of this character by means of which the skin or outer covering of potatoes, apples, and like vegetables and fruits may be rapidly and conveniently removed.

A further object of the invention is to provide a device of this character stamped from a single piece of material having its body portion concaved and provided with a diagonally-disposed cutting edge, the upper portion of which is bent outwardly and downwardly to permit the knife to conform to the shape of the potato or other vegetable to be pared, the body portion being also provided at one side with a knife-edge terminating in a spur or point by means of which the eyes of the potato may be removed.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the spirit or sacrificing any of the advantages of this invention.

In the accompanying drawings, Figure 1 is a front elevation of a potato-peeler constructed in accordance with my invention. Fig. 2 is a rear elevation of the same. Fig. 3 is a transverse section on the line 3 3 of Fig. 1. Fig. 4 is a transverse section on the line 4 4 of Fig. 1. Fig. 5 is a perspective view of a modified form of peeler. Fig. 6 is a transverse sectional view of Fig. 5, and Fig. 7 is a side elevation of the peeler looking in the direction of the rear edge of the knife-blade.

1 designates the potato-peeler, preferably formed of a single piece of sheet-steel or other suitable material, pressed or stamped into the desired shape, and consisting of a body portion 2, substantially triangular in contour, the lower end thereof being tapering, as shown, and having its side edges bent inwardly on the body portion to permit the tool to be easily grasped by the hand in using the same. The body portion is inwardly curved or concaved, as shown at 3, the upper end thereof being provided with a diagonally-disposed slot or opening 4, defining an upstruck lip 5, provided with a cutting edge 6, the rear portion of the lip being bent outwardly and downwardly, as shown at 7, to permit the tool to accommodate itself to any irregularities on the surface of the potato or other vegetable being pared. One side of the body portion is provided with a knife-edge 8, by means of which any decayed part of the vegetable may be removed, the upper inclined edge 9 of the tool terminating in a spur or point 10, adapted to remove the cores of fruits or the eyes of the potatoes, &c.

In operation the lower tapering end of the tool is grasped in the right hand, and the potato or other vegetable to be peeled in the other hand, and by moving the tool over the surface of the potato the knife removes the skin, which passes through the slot or opening 4 on top of the body portion, from which it can be removed by turning the tool upside down. In order to get into small corners or crevices of the potato, or to remove any decayed portion thereof, the operator uses the knife-edge 8, the upper inclined portion of the tool permitting the same to be easily grasped and conveniently manipulated during said operation. The eyes in the potato or cores in fruit are easily removed by using the spur 10, which permits the operator to dig out the eyes or cores and remove them by slightly turning the peeler.

In Fig. 4 I have shown a modified form of peeler in which the diagonally-disposed opening is formed with an upstruck rearwardly-curved tongue 11, which permits the more ready discharge of the peeling.

By having the body portion concaved it permits the tool to conform to the shape of the potato or other vegetable, while by having the upper edge of the tool inclined and bent outwardly and downwardly, in the manner described, it not only affords a convenient means for gripping the tool while using the knife 8, but also permits the tool to conform to any hollow portion on the surface of the potato.

From the foregoing description it will be seen I have provided a simple, inexpensive, and efficient potato-peeler capable of evenly and effectively removing the skin or covering of potatoes and other vegetables and by reason of its extreme simplicity can be manufactured and put on the market at a small cost.

Having thus described the invention, what I claim, and desire to secure by Letters Patent, is—

1. A paring-knife consisting of a concave body portion in the form of an obtuse-angled triangle provided with a blade forming one side of a slot extending across the concavity and disposed parallel to a side adjacent the obtuse angle.

2. A paring-knife comprising a transversely-concaved body portion, one end of which is tapered to form a handle, and the opposite end provided with a slot disposed at an oblique angle to the length thereof, and a knife-blade extending above and across the concave surface of the body portion.

3. A knife comprising a concave body portion in the form of an obtuse-angled triangle, having a slot parallel to a side adjacent the obtuse angle and extending across the concavity, and a knife-blade forming one side of the slot, having its rear edge bent outwardly and downwardly.

4. A paring-knife comprising a transversely-concaved body portion, one end of which is tapered to form a handle, and the opposite end provided with a slot disposed at an oblique angle to the length thereof, a concave knife-blade extending across the cancave surface of the body portion at said slot and having its rear edge bent outwardly and downwardly, said body portion being provided with a cutting edge at one side, and a cutting-point at the joining of said side and the front edge.

In testimony that I claim the foregoing as my own I have hereto affixed my signature in the presence of two witnesses.

THEODORE M. GUEST.

Witnesses:
SAMUEL N. ACKER,
FRANK S. APPLEMAN.